United States Patent [19]
Neukermans

[11] Patent Number: 5,841,553
[45] Date of Patent: Nov. 24, 1998

[54] COMPACT DOCUMENT SCANNER OR PRINTER ENGINE

[75] Inventor: Armand P. Neukermans, Palo Alto, Calif.

[73] Assignee: XROS, Inc., Mountain View, Calif.

[21] Appl. No.: 773,097

[22] Filed: Dec. 24, 1996

Related U.S. Application Data

[60] Provisional application No. 60/009,255 Dec. 26, 1995.

[51] Int. Cl.[6] .............................. H04N 1/04; G01J 1/00; G02B 26/08
[52] U.S. Cl. .......................... 358/494; 358/474; 250/228; 250/574; 359/214
[58] Field of Search ..................................... 358/473, 474, 358/487, 496, 498, 494; 355/45, 50, 51, 60, 58; 399/108; 250/236, 228, 574, 234; 259/214, 221, 224

[56] References Cited

U.S. PATENT DOCUMENTS

| | | | |
|---|---|---|---|
| 4,762,994 | 8/1988 | Byerly et al. ............................ | 250/236 |
| 4,800,400 | 1/1989 | Douglas .................................. | 347/263 |
| 5,256,886 | 10/1993 | Wolf et al. ............................... | 250/574 |
| 5,488,862 | 2/1996 | Neukermans et al. ................ | 73/504.02 |
| 5,543,956 | 8/1996 | Nakagawa et al. .................... | 359/225 |
| 5,629,790 | 5/1997 | Neukermans et al. ................... | 359/214 |

*Primary Examiner*—Kim Yen Vu
*Assistant Examiner*—Kimberly A. Williams
*Attorney, Agent, or Firm*—Donald E. Schreiber

[57] ABSTRACT

A compact medium scanner (100) scans a surface (132) of a medium (134) with a beam of light (106). A medium transport mechanism (202, 206) advances the surface along a medium transport path through a scanning station. A light source (104) produces a collimated beam of light (106) that impinges upon a mirror plate (112) of a micromachined torsional scanner (108). A pair of coaxially aligned torsion bars (304) support the mirror plate (112) within the torsional scanner (108). A mirror-surface drive means (306, 312) rotates the mirror plate (112) about the torsion bars (304). A single reciprocation of the mirror plate (112) by the drive means (306, 312) deflects the beam of light (106) over a fan-shaped region having a virtually fixed vertex (128) on the mirror plate (112). Scanner optics (116, 122) direct the fan-shaped region beam of light (106) onto the surface (132) of the medium (134) then present in the scanning station to thereby scan across the medium (134) with the beam of light (106).

22 Claims, 8 Drawing Sheets

COMPACT DOCUMENT SCANNER OR PRINTER ENGINE

CLAIM OF PROVISIONAL APPLICATION RIGHTS

This application claims the benefit of United States Provisional Patent Application No. 60/009,255 filed on Dec. 26, 1995.

BACKGROUND OF THE INVENTION

1. Field of the Invention

The present invention relates generally to the technical field of scanning a surface of a medium, either a document or a photosensitive surface, with a beam of light and, more particularly, to an extremely thin configuration for such a device which permits the document scanner's integration into a keyboard, or any other structure in which volume, weight or footprint are a major consideration.

2. Description of the Prior Art

Present document scanners for scanning an entire letter size (8½×11 inch) document are rather bulky. The smallest portable document scanners that are commercially available and that are capable of processing a letter size document have a shape which is typically square or rectangular, and are on the order of 4 inches high, by 3 inches deep and 9 to 10 inches wider. In use, such a document scanner typically sits on a desk top or other work surface, for example between the keyboard and the display of a personal computer ("PC"). In operation, the document is inserted into an entrance slit, curves through a 1 to 2 inches diameter arc within the document scanner, and exits the document scanner up side down after having reversed direction.

Figure 1:
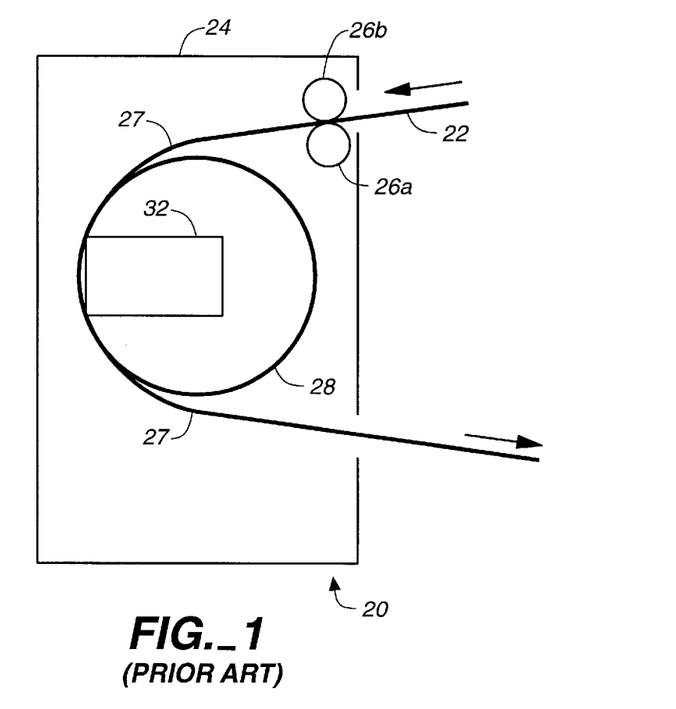
FIG. 1 is a cross-sectional side elevational view illustrating a prior art compact document scanner.

FIG. 1 illustrates the cross-sectional structure of such a document scanner which is identified by the general reference character 20. A document 22 enters an enclosure 24 of the document scanner 20 to be guided by rollers 26a and 26b along a curved path 27 past a drum 28. A scanner head 32, located within the drum 28, illuminates the document 22 and a photo-diode array within the drum 28 produces pixel data representing an image present on the document. After passing the scanner head 32, the document continues along the curved path 27 to exit the enclosure 24 in a direction almost opposite to that at which it entered. The scanner head 32 included in such a document scanner 20, which is the same as that used in fax machines, is typically about 2 cm high, includes an array of light emitting diodes ("LED")for illuminating the document, and graded index ("GRIN") lenses for imaging the document on a butted photo-diode array. The LED illumination array, the GRIN lens array and the photo-diode array are all slightly wider than the width of the paper.

Another type of document scanner used with PCs is of the flatbed type. In flat-bed document scanners, a sheet of paper lays on a transparent flat glass plate, and the document scanner moves a charge coupled device ("CCD") array or other imaging system past the document to obtain pixel data representing an image present on the document. Flat-bed document scanners typically have higher resolution and quality than the document scanner depicted in FIG. 1, but they are bulky. Flat-bed document scanners generally occupy a considerable amount of space on a work surface, having a profile that is one and one-half to twice the size of the document being scanned.

In addition to the two types of document scanners described above that are presently widely used with PCs, another well recognized class of scanning devices employ flying-spot scanning. In flying-spot document scanners, a dot of light traces a raster on the document's surface while a light detector produces pixel data in response to light scattered or reflected from the document's surface. While flying-spot document scanners generally provide higher quality scanning than that provided by the devices described above, such scanners are not widely used with PCs because they tend to be comparatively large and very expensive.

While flying-spot document scanners are not widely used with PCs, flying-spot scanning technology is widely used in laser printers for such computers. In laser printers, an intensity modulated flying-spot scans a photo-conductive surface thereby forming a latent image that is then developed onto the printed document. The processes within a laser printer which converts the latent image on the photo-conductive surface into an image on the printed document are similar to, if not identical to, the processes used in xerography. Accordingly, it is readily apparent that the flying-spot scanner portion of a document scanner can, in principle, be readily adapted for use in a laser printer for forming a latent image of a document to be printed.

SUMMARY OF THE INVENTION

An object of the present invention is to provide a light, compact medium scanner for digital computers.

Another object of the present invention is to provide a medium scanner that is so compact that it may be integrated into various digital computer units such as the computer itself, or into a keyboard.

Another object of the present invention is to provide a medium scanner that is so compact that it may be integrated into a laptop digital computer without increasing the laptop computer's footprint.

Another object of the present invention is to provide a medium scanner that is easier to design.

Yet another object of the present invention is to provide a compact medium scanner which is simpler.

Yet another object of the present invention is to provide a compact medium scanner that is cost effective, easy and economical to manufacture, and easy to maintain.

Briefly, the present invention is a compact medium scanner that is adapted for scanning a surface of a medium with a beam of light. The medium scanner includes a medium transport mechanism for advancing the surface of the medium along a medium transport path through a scanning station located within the medium scanner. The medium scanner also includes a light source for producing a collimated beam of light. The beam of light impinges upon a mirror plate of a micromachined torsional scanner. A pair of coaxially aligned torsion bars disposed on opposite sides of the mirror plate support the mirror plate within the micromachined torsional scanner. The torsion bars and the mirror plate are preferably formed as one piece by micromachining from a silicon wafer. The compact document scanner includes a mirror-surface drive means for rotating the mirror plate about the torsion bars from a rest position. Reciprocation of the mirror plate of the micromachined torsional scanner by the drive means during a time interval of a single reciprocation deflects the beam of light over a fan-shaped region having a virtually fixed vertex on the mirror plate of the micromachined torsional scanner. Scanner optics direct the fan-shaped region beam of light onto the surface of the medium then present in the scanning station to thereby scan across the medium with the beam of light.

A compact document scanner in accordance with the present invention for scanning letter size documents may be made so small that it will fit within the footprint of a laptop PC. Alternatively, the compact document scanner may be enclosed within a keyboard, a desktop PC, or a tower PC. A compact document scanner adapted for scanning business cards may be made so small that it may be enclosed within a personal organizer.

These and other features, objects and advantages will be understood or apparent to those of ordinary skill in the art from the following detailed description of the preferred embodiment as illustrated in the various drawing figures.

DETAILED DESCRIPTION OF THE PREFERRED EMBODIMENT

Figure 2:
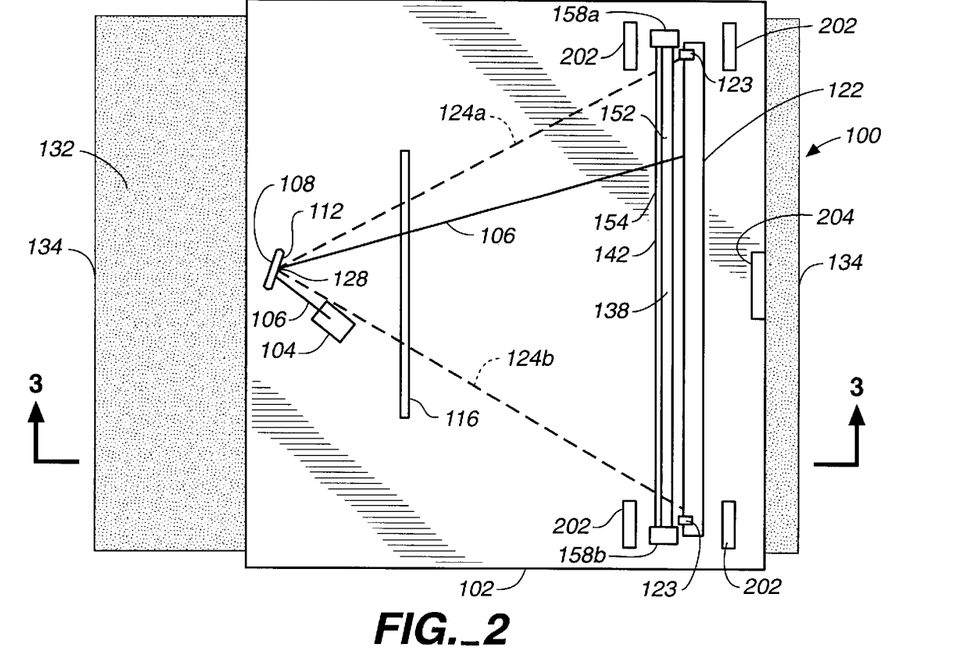
FIG. 2 is a cross-sectional plan view illustrating a compact document scanner in accordance with the present invention.

FIG. 2 illustrates a preferred embodiment of a compact document scanner in accordance with the present invention referred to by the general reference character 100. The document scanner 100 includes a housing 102 that encloses a light source 104, preferably a laser diode together with optics for collimating a beam of light 106 emitted by the laser diode. For specific applications, the light source 104 may include an intensity modulator for turning the beam of light 106 on and off.

Also fixed within the housing 102 is a silicon micromachined torsional scanner 108 that includes a reciprocating mirror plate 112. The beam of light 106 preferably impinges; directly upon the mirror plate 112 upon emission from the light source 104. The torsional scanner 108 is preferably constructed in accordance with the description set forth in U.S. patent application Ser. No. 08/139,397 entitled "Micromachined Torsional Scanner" filed Oct. 18, 1993, by Armand P. Neukermans and Timothy G Slater ("the '397 patent application"). The '397 patent application is hereby incorporated by reference as though fully set forth here. The optical reflectivity of the mirror plate 112 is preferably increased over that of the silicon material from which the torsional scanner 108 is fabricated by overcoating such silicon material with a highly reflective material such as aluminum ("Al"). In accordance with the description set forth in greater detail in U.S. Pat. No. 5,488,862 entitled "Monolithic Silicon Rate-Gyro with Integrated Sensors" that issued Feb. 6, 1996, on an application also filed by Armand P. Neukermans and Timothy G. Slater ("the '862 patent"), the torsional scanner 108 also includes a sensor (not separately depicted in FIG. 2) that is integrated into at least one of a pair of collinear torsion bars that support the mirror plate 112 within the torsional scanner 108. An electrical signal (if necessary suitably compensated for temperature variations) produced by the sensor integrated into the torsion bars encodes angular position of the mirror plate 112 with respect to the housing 102. The '862 patent is hereby incorporated by reference as though fully set forth here.

As described in greater detail in the '397 patent application and in the '862 patent, within the torsional scanner 108 either an electrostatic and/or and electro-magnetic force applied to the mirror plate 112 induces rotation of the mirror plate 112 with respect to the housing 102. In general, the mirror plate 112 may rotate as much as ±22.50° away from a rest position to which the mirror plate 112 returns in an absence of an applied electrostatic or electromagnetic force. Accordingly, during operation of the document scanner 100 the mirror plate 112 reciprocates back-and-forth on either side of its rest position responsive to either an applied electrostatic and/or and electro-magnetic force. As explained in greater detail in the '397 patent application and in the '862 patent, such reciprocating motion of the mirror plate 112 may be driven either in a sinusoidal, self-oscillating mode at a frequency equal to the principal torsional vibrational mode of the mirror plate 112, or in a galvanometric mode at a much lower frequency. When operating in the galvanometric mode, reciprocation of the mirror plate 112 below some maximum frequency may be driven in almost any arbitrary manner. Specifically, the galvanometric mode permits the mirror plate 112 to reciprocate in either a saw-toothed or a triangular manner, both of which are well recognized in the art.

Upon reflection from the mirror plate 112, the beam of light 106 passes through an aspheric lens 116 that is; preferably molded from plastic. The beam of light 106 after passing through the aspheric lens 116 impinges upon a turning mirror 122. Electrical signals produced by a pair of photo-diodes 123 located near opposite ends of the turning mirror 122 in FIG. 2 indicate the start and end of each successive scan of the beam of light 106 across the turning mirror 122. Thus, the electrical signals from the photo-diodes 123 provide references for the position of the beam of light 106 that are independent of the beam position as indicated by the sensor which is integrated into the torsion bars that support the mirror plate 112. During a time interval for a single reciprocation of the mirror plate 112, the mirror plate 112 deflects the beam of light 106 over a substantially planar, fan-shaped region bounded by the dashed lines 124a and 124b depicted in FIG. 2. Because the mirror plate 112 is, in general, extremely thin, e.g. 20–50 microns, and because the mirror plate 112 rotates about a common axis of the pair of collinear torsion bars that support the mirror plate 112 within the torsional scanner 108, the beam of light 106 in sweeping out the fan-shaped region bounded by the dashed lines 124a and 124b has a virtually fixed vertex 128 located on the mirror plate 112 of the torsional scanner 108.

The fixed vertex 128 provided by the mirror plate 112 of the torsional scanner 108 is a feature that distinguishes the document scanner 100 of the present invention from conventional rotating polygon mirror scanners, such as those used in PC laser printers. Because the mirror surface of a rotating polygon mirror scanner is located at a significant distance from its axis of rotation, e.g. 2700 microns, the point of incidence of the beam of light on the rotating polygon mirror reciprocates back-and-forth with respect to the axis of the polygon's rotation. In a similar way, conventional galvanometers have their mirror surface at a distance of approximately 500–2000 microns from their axis of rotation which, while less than that of the rotating polygonal mirror, still causes the beam of light to reciprocate back-and-forth with respect to the galvanometers' axis of rotation.

Figure 3:
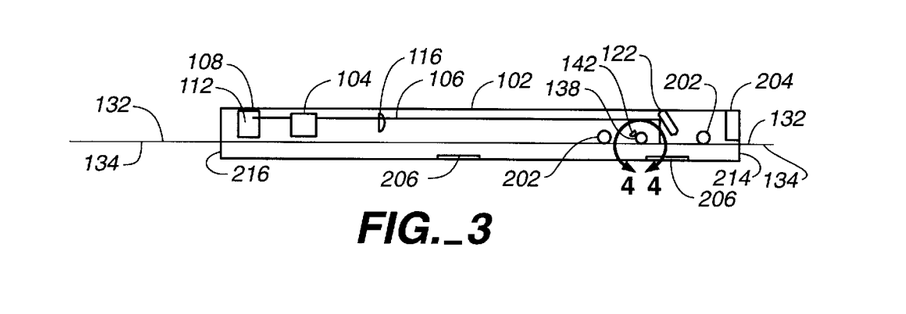
FIG. 3 is a cross-sectional side elevational view illustrating a compact document scanner in accordance with the present invention taken along the line 3—3 in FIG. 2.
Figure 4:
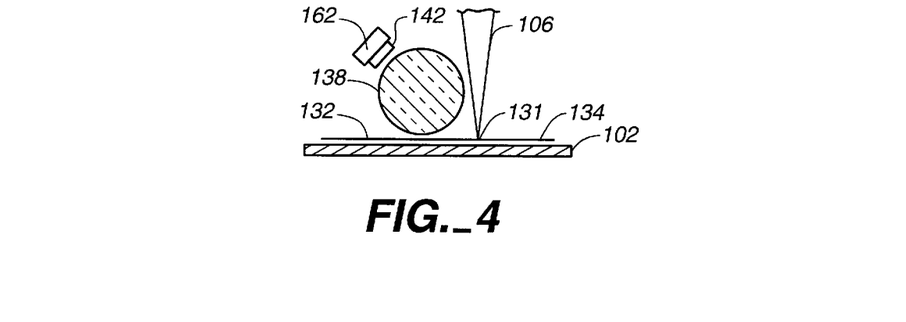
FIG. 4 is an enlarged cross-sectional side elevational view illustrating a compact document scanner in accordance with the present invention taken along the line 4—4 in FIG. 3.

As depicted in FIGS. 3 and 4, the turning mirror 122 redirects the beam of light 106 through an angle from the planar fan-shaped region through which the reciprocating mirror plate 112 sweeps the beam of light 106. Impingement of the beam of light 106 in a focused spot 131 on a surface 132 of a document 134 scatters the beam of light 106 in various different directions. Some of the beam of light 106 scattered from the surface 1:32 passes through a light collecting cylindrical lens 138 which brings such scattered light into approximate focus on a detector 142. The angle through which the turning mirror 122 redirects the beam of light 106 is optimized for maximum light collection by the cylindrical lens 138 for focusing onto the detector 142.

The cylindrical lens 138 can be a simple glass or plastic rod having a diameter of 1 to several mm. The cylindrical lens 138 collects 35% to 40% of the light scattered by document 134, and directs such scattered light onto the detector 142. Scattering of the beam of light 106 as it scans across the surface 132 of the document 134 produces an amount of light at the detector 142 which varies depending upon absorption of the beam of light 106 by the surface 132. This varying amount of light impinging upon the detector 142 produces a proportionally varying photo-current in the detector 142 which is then amplified, digitized and processed by electronics connected to detector 142, that are well known in the art.

Figure 5:
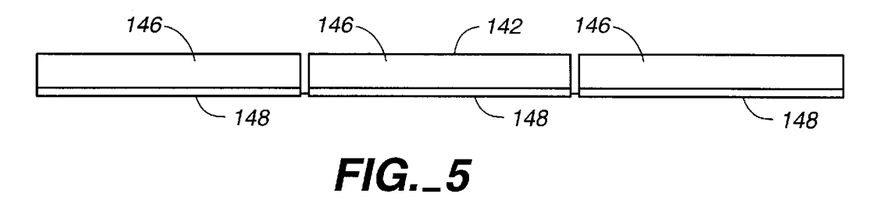
FIG. 5 is a plan view depicting a portion of a photo-diode array adapted for use in the compact document scanner depicted in FIG. 2.

The detector 142 preferably includes an array of very narrow silicon photo-detectors 146 butted together end-to-end along the length of the detector 142 as indicated in FIG. 5. The overall length of the detector 142 equals or slightly exceeds the width of the document 134 along the path of the scanning beam of light 106. The photo-detectors 146 forming detector 142 are all wired in parallel, and include an impedance lowering surface metal stripe 148 on a face of the photo-detectors 146 upon which light impinges. Typical dimensions for each photo-detector 146 are 0.3 to 1.0 mm wide and about 2.0 cm long. Thus, a document scanner 100 for scanning letter size paper will require about 11 photo-detectors 146 to form the array. These dimensions are not critical, and generally can be optimized to produce maximum yield during fabrication of the photo-detectors 146, and thereby lowest cost for the detector 142. A strip of amorphous silicon, or solar cell grade material, is usually adequate for the photo-detector 146.

The focus of the beam of light 106 at the spot 131 is a hundred microns in front of cylindrical lens 13E, and detector 142 is positioned to receive the greatest amount of light collected by the cylindrical lens 138. The location of the detector 142 is not critical, as long as most of the scattered light collected by the cylindrical lens 138 reaches the detector 142. With relatively little loss of light, the detector 142 can contact the cylindrical lens 138 so a separate mechanical support 162 for the photo-detectors 146 may not always be required.

The detector 142 may employ an alternative, but less preferred, structure that may be incorporated into the document scanner 100 instead of the cylindrical lens 138 and the photo-detectors 146. This alternative structure, illustrated in FIG. 2, employs an elongated translucent glass or plastic rod 152 instead of the cylindrical lens 138. The rod 152 has an overall length that equals or slightly exceeds the width of the document 134 along the path of the scanning beam of light 106. A long diffuse reflector stripe 154 contacts the back of rod 152 diametrically opposite the spot 131 of the beam of light 106. Instead of using the array of photo-detectors 146, the alternative structure for the detector 142 employs two simple photo-diodes 158a and 158b located at opposite ends of the rod 152. In this alternative structure for detector 142, the reflector stripe 154 scatters light that enters the rod 152, and the rod 152 then channels the light scattered by the reflector stripe 154 to opposite ends of the rod 152 where it impinges upon the photo-diodes 158a and 158b. The output signals from the photo-diodes 158a and 158b can be summed and processed in the same manner as the output signals from the photo-detectors 146. One disadvantage of this alternative structure is that much less light impinges on the photo-diodes 158a and 158b than impinges upon the photo-detectors 146 of the preferred detector 142.

The arrangement of the light source 104, torsional scanner 108 aspheric lens 116 and turning mirror 122 provides a compact scanner for any medium, which, in the instance depicted in FIGS. 2–4, is the document 134. The light source 104, torsional scanner 108 aspheric lens 116 and turning mirror 122 focuses the beam of light 106 into the spot 131 that has an almost constant diameter across the entire width of the document 134. The bear of light 106, when brought to a focus on document 134, may typically have a diameter ranging between 50 to 150 microns that is almost constant over the entire scan width. This diameter for the spot 131 is the same as that usually used for scanning beams used in PC laser printers. The simple motion of the reciprocating mirror plate 112, as compared to a rotating polygon generally used in PC laser printers, makes the design of aspheric lens 116 much simpler, and results in lower cost for the tooling to manufacture the surfaces of the aspheric lens 116.

Considering now the overall operation of the document scanner 100 to produce pixel data suitable for input to a PC, both the photo-current from the photo-detectors 146, which is generated as the beam of light 106 scans the surface 132, and the location of the beam of light 106 on the surface 132, as provided by an electrical signal from the sensor integrated into the torsion bars that support the mirror plate 112, can be encoded into pixel data concurrently by a conventional electronic circuit included in the document scanner 100 that is not depicted in any of the FIGS. Hence, torsional scanner 108 and the detector 142 provide all the data required to transmit pixel data to a PC.

The document scanner 100 also includes a transport for moving the document 134 through the housing 102 that includes document feeder rolls and motor 202. A document detector 204 included in the document scanner 100 senses insertion of the document 134 into the housing 102 and immediately starts operation of the light source 104, torsional scanner 108, detector 142 and rolls and motor 202 as well as the electronic circuitry required for communicating and exchanging data with a PC. The document detector 204 may be optical, e.g. an led/photo transistor pair, mechanical, e.g. a micro-switch, or any other suitable device. The rolls and motor 202 keep the document 134 taut by driving it through the housing 102 with slightly different speeds. A preferred embodiment for the rolls and motor 202 are grit wheel rollers, containing sandpaper, as used in some digital computer plotting devices. A pair of electrostatic clamps 206, typically in the for of interdigitated fingers overcoated with a thin layer of low friction material such as Teflon® are located between the housing 10; and the document 134. Adjustment of an electrical potential applied to the electrostatic clamps 206 pulls the document 134 lightly against the bottom of housing 102 to hold the surface 132 of the document 134 in the focus plane of beam of light 106. Thus, the rolls and motor 202 and the electrostatic clamps 206 provide a medium transport for transporting the document 134 along a medium transport path through the housing 102.

As the document 134 moves through the housing 102 under the beam of light 106 driven by the rolls and motor 202, the document scanner 100 repetitively scans back-and-forth across the surface 132 while encoding the entire document 134. To coordinate movement of the document 134 through the housing 102 with movement of the beam of light 106 across the width of the document 134, the electrical signal produced by the sensor integrated into the torsion bars that support the mirror plate 112 is used as a clocking signal for advancing the document 134 with the rolls and motor 202.

All the optical components of the document scanner 100 illustrated in FIGS. 2–4, particularly the torsional scanner 108, are extremely small and inexpensive in comparison with conventional scanners. A printed circuit ("PC") board, not depicted in any of the FIGS., is very thin and may be attached to the top of housing 102. The electronic components on the PC board are very short, permitting the housing 102 to be extremely thin, as thin as 5.0 mm, or even less. The width of the housing 102 may be somewhat smaller than 9 inches to accommodate standard 8-½ in. wide documents 134, and the length of the housing 102 along the direction of document travel can be as short as 6.0 in.

Figure 13:
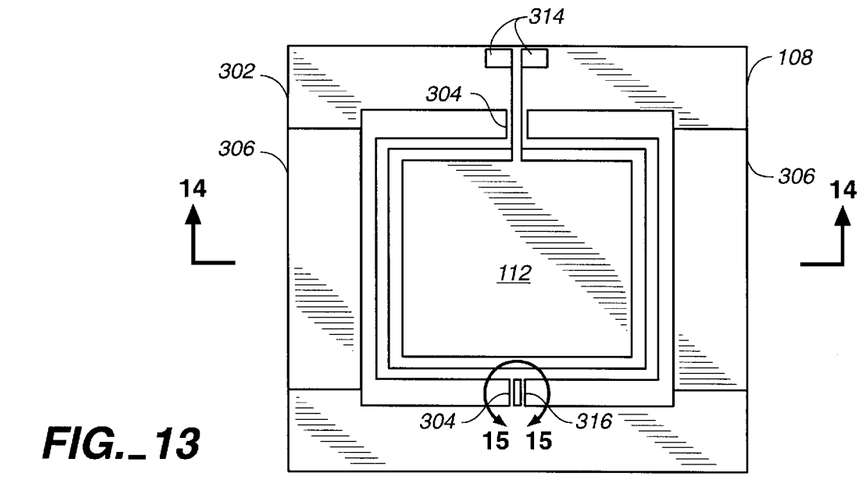
FIG. 13 is a plan view of a torsional scanner such as that included in the compact document scanner illustrated in FIG. 2.

FIG. 13 depicts the micromachined torsional scanner 108 described in greater detail in the '397 patent application. The torsional scanner 108 includes the micromachined, box-frame mirror plate 112 that is supported within an outer frame 302 by a pair of coaxial, opposed torsion bars 304. As explained in greater detail in the '397 patent application, the mirror plate 112, the outer frame 302 and the torsion bars 304 are preferably formed as one piece by micromachining a silicon wafer. As also explained in the '397 patent application, the mirror plate 112 exhibits a plurality of vibrational modes including a principal torsional vibrational mode.

Figure 14:
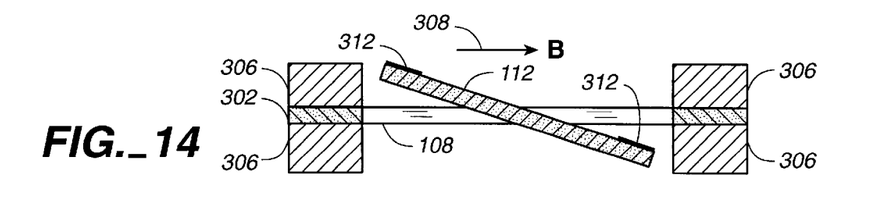
FIG. 14 is a cross-sectional elevational view of the torsional scanner taken along the line 14—14 in FIG. 13.

As described in the '397 patent application, the mirror plate 112 may be rotated about the torsion bars 304 from a rest position either by electrostatic or electro-magnetic forces applied to the mirror plate 112. The torsional scanner 103 included in the document scanner 100 preferably employs an electro-magnetic drive depicted in FIG. 14. Accordingly, the torsional scanner 108 includes pairs of permanent magnets 306 mounted on opposite sides of the outer frame 302 disposed both above and below the outer frame 302. The permanent magnets 306 establish a magnetic field "B" indicated in FIG. 14 by an arrow 308. A conductive coil 312 encircles the mirror plate 112, and leads 314 for the conductive coil 312 pass across one of the torsion bars 304. An alternating current ("AC") applied to the conductive coil 312 through the leads 314 interacts with the magnetic field of permanent magnets 306 to induce reciprocating rotation of the mirror plate 112 about the torsion bars 304 with respect to the outer frame 302.

Figure 15:
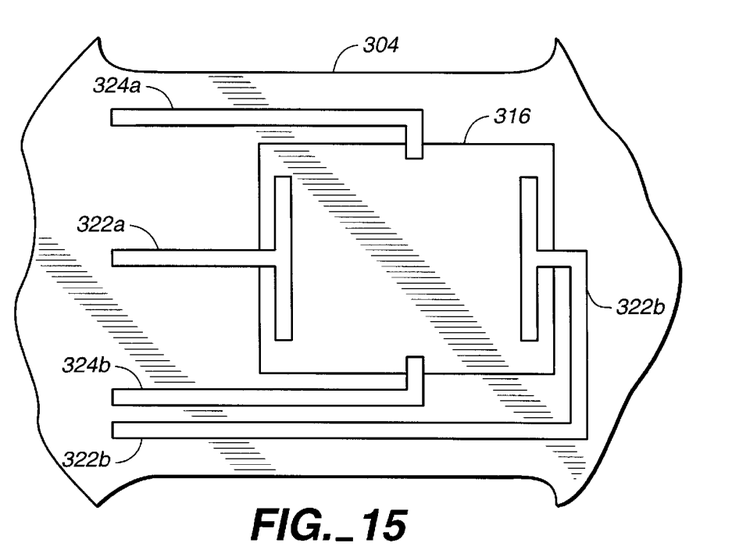
FIG. 15 is an enlarged plan view of the torsion sensor included in the torsional scanner taken along the line 15—15 in FIG. 13.

The other torsion bar 304 carries a torsional sensor 316 of a type described in greater detail in the '862 patent. An electric current is applied to sensor-input leads 322a and 322b of the torsional sensor 316 illustrated in greater detail in FIG. 15. Torsion in the torsion bar 304 generates a voltage perpendicular to current flow. The voltage perpendicular to the current flow appears across sensor-output leads 324a and 324b. This output voltage from the torsion bar 304 is proportional to the shear (or torsion) stress in the torsion bar 304, and hence to the angular rotation of the mirror plate 112 about the torsion bars 304 with respect to the outer frame 302.

Figure 6:
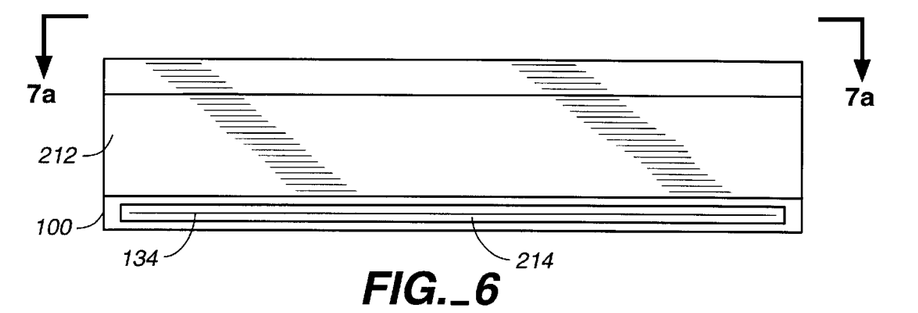
FIG. 6 is a front elevational view of a portable PC to the bottom of which is secured a document scanner in accordance with the present invention.
Figure 6A:
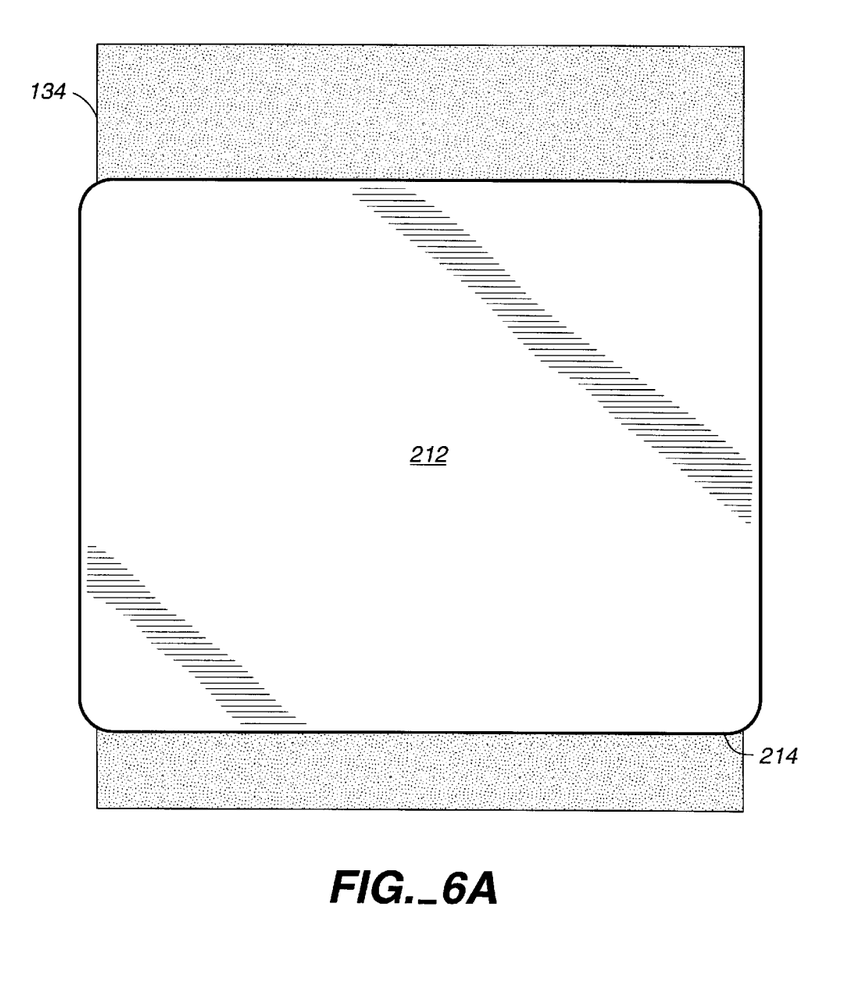
FIG. 6a is a plan view of the portable PC taken along the line 6a—6a in FIG. 6.

FIGS. 6 and 6a depict a portable PC 212 beneath which attaches the document scanner 100 depicted in FIG. 2. The document scanner 100 may either be an integral part of the portable PC 212, or may be a removable snap-on attachment. Most portable PCs are approximately 9 inches wide by 11 inches deep. As illustrated in FIG. 6, the diminutive size of the document scanner 100 as described above allows attaching or integrating the document scanner 100 beneath the portable PC 212. The snap-on attachment document scanner 100 may receive electrical power and make other connections to the portable PC 212 through a dedicated plug in the bottom of the computer, not illustrated in any of the FIGS. The document 134 is inserted through a input slit 214 at the front of the housing 102, and exits through a exit slit 216 at the back. The diminutive size of the document scanner 100 permits rotating its orientation by 90° with respect to the portable PC 212, if desired. Either configuration of the document scanner 100 with the portable PC 212 provides a document scanner within the footprint of the portable PC 212. If the portable PC 212 includes a fax-modem, then including the document scanner 100 in the portable PC 212 permits the portable PC 212 to also function as a portable facsimile transmitting device.

Figure 7:
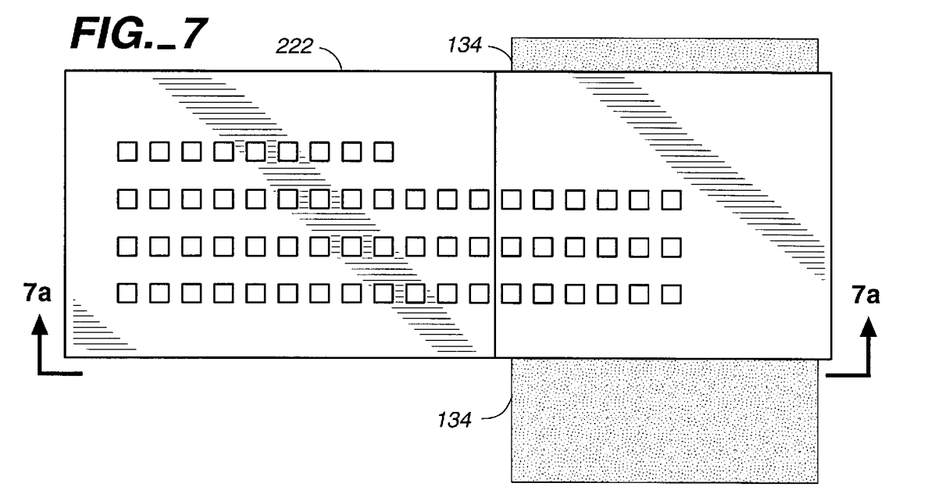
FIG. 7 is a plan view of a keyboard used with a PC which incorporates a document scanner in accordance with the present invention.
Figure 7A:
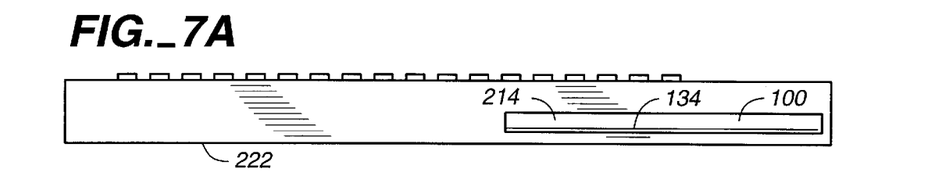
FIG. 7a is a front elevational view of the keyboard taken along the line 7a—7a in FIG. 7.
Figure 8:
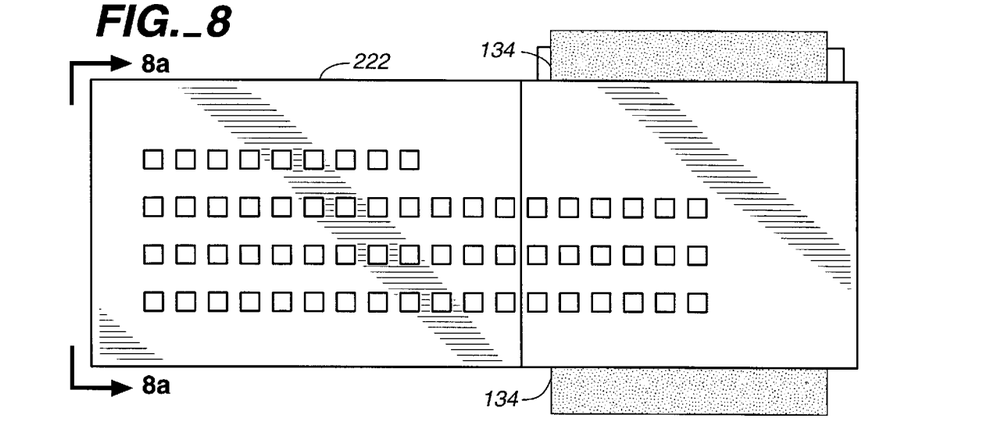
FIG. 8 is a plan view of a keyboard used with a PC which incorporates a document scanner in accordance with the present invention that permits inserting a document at the back of the keyboard.
Figure 8A:
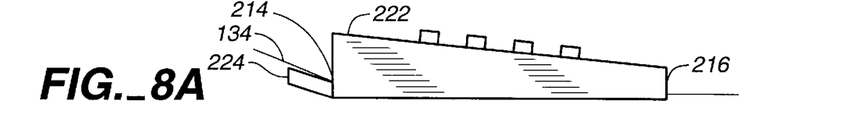
FIG. 8a is a side plan view of the keyboard taken along the line 8a—8a in FIG. 8.

FIGS. 7, 7a, 8 and 8a depict alternative ways in which the document scanner 100 may be integrated into a keyboard 222 of a PC. While these FIGS. depict the compact document scanner 100 as being located at the right hand end of the keyboard 222, it is readily apparent that the document scanner 100 may be located at the left, right or center of the keyboard 222 as judged most convenient for a particular application. FIGS. 7 and 7a illustrate insertion of the document 134 into the document scanner 100 from the front of the keyboard 222 which is suitable for those configurations where sufficient space is available at the user's workstation behind the keyboard 222. In the configuration depicted in FIGS. 8 and 8a, a paper guide 224 located at the back of the keyboard 222 permits inserting the document 134 almost vertically into the back of the keyboard 222. The paper guide 224 included in the configuration depicted in FIGS. 8 and 8a adapts the keyboard 222 depicted in FIGS. 8 and 8a for use where there is little space behind the keyboard 222 at the user's workstation. Both configurations of the keyboard 222 that include the document scanner 100 provide a document scanner within the footprint of the conventional keyboard 222, and therefore the document scanner 100 occupies no additional space at the user's workstation.

Figure 9:
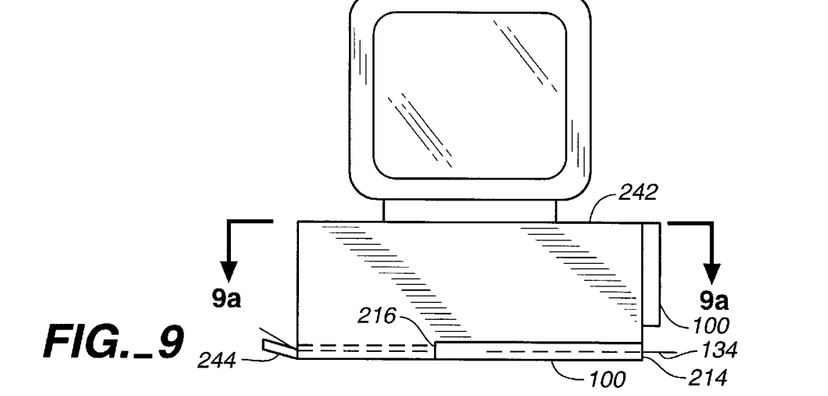
FIG. 9 is a front elevational view of a desktop PC to the bottom of which is secured a document scanner in accordance with the present invention.
Figure 9A:
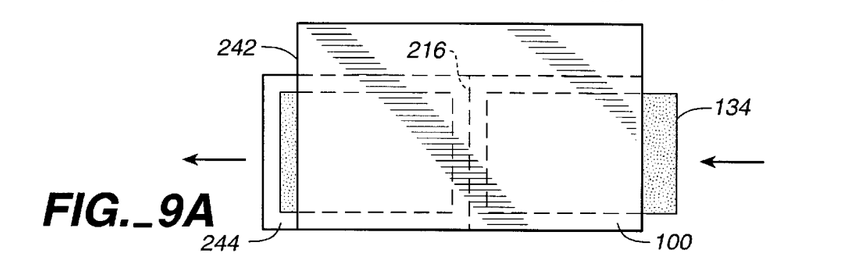
FIG. 9a is a plan view of the desktop PC taken along the line 9a—9a in FIG. 9.

FIGS. 9 and 9a depict how the document scanner 100 may be incorporated into a desktop PC 242. Similar to the portable PC 212, the document scanner 100 is preferably integrated in the bottom section of the desktop PC 242. Locating the document scanner 100 in the bottom of the desktop PC 242 permits using the work surface upon which the desktop PC 242 rests to guide the document 134 into a tray 244 after scanning. An alternative configuration for the document scanner 100, also illustrated in FIG. 9, secures the document scanner 100 to the side of the desktop PC 242. The document scanner 100 need not be integrated into the desktop PC 242 in such an installation thereby permitting easy retrofitting of the document scanner 100 onto an existing desktop PC 242. The configurations of the document scanner 100 included in a desktop PC 242 provides a document scanner within the footprint of the desktop PC 242, and therefore the document scanner 100 occupies no additional space at the user's workstation.

Figure 10:
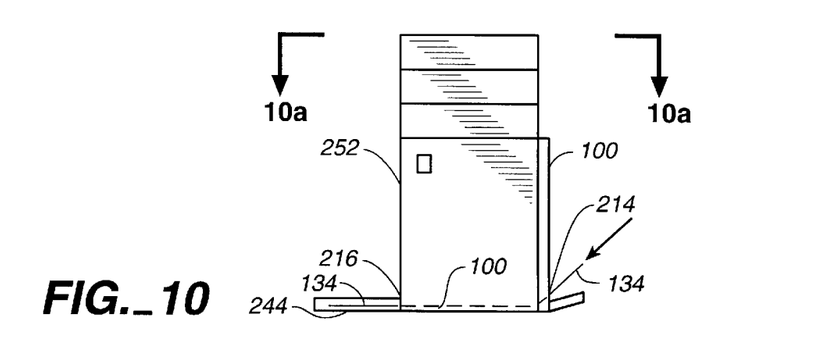
FIG. 10 is a front elevational view of a desktop PC to the bottom of which is secured a document scanner in accordance with the present invention.
Figure 10A:
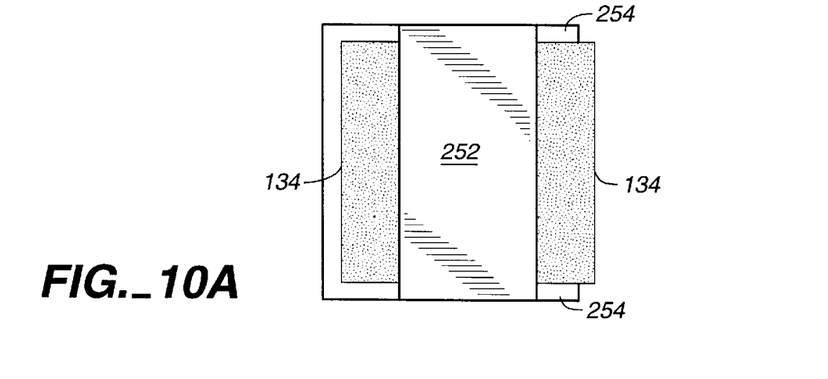
FIG. 10a is a plan view of the desktop PC taken along the line 10a—10a in FIG. 10.

FIGS. 10 and 10a illustrate a configuration in which the document scanner 100 is incorporated into a tower PC 252. The document scanner 100 is preferably integrated into the bottom of the tower PC 252. A guide 254 is used to introduce the document 134 at the input slit 214, and the document scanner 100 deposits the document 134 into a tray 244 after scanning. The configurations of the document scanner 100 included in a tower PC 252 provides a document scanner within the footprint of the tower PC 252, and therefore the document scanner 100 occupies no additional space at the user's workstation. Similar to the desktop PC 242, the document scanner 100 may also be integrated on the side of the tower PC 252, as depicted in FIG. 10. Since the document scanner 100 need not be integrated into the tower PC 252, the document scanner 100 may be easily retrofitted onto an existing desktop PC 242.

Figure 11:
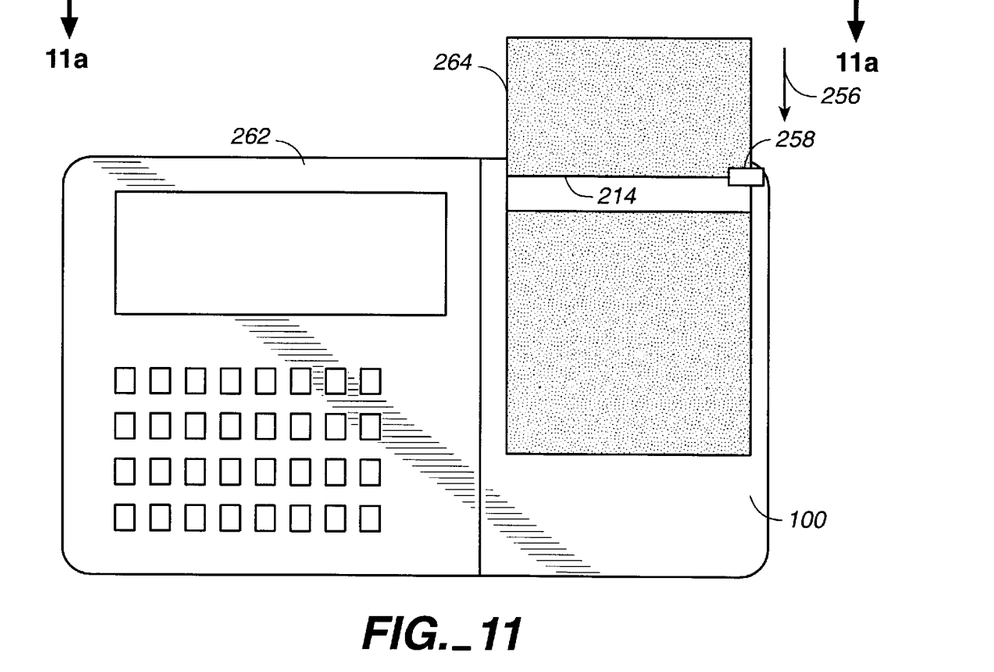
FIG. 11 is a plan view of a digital personal organizer which incorporates a small document scanner in accordance with the present invention.
Figure 11A:
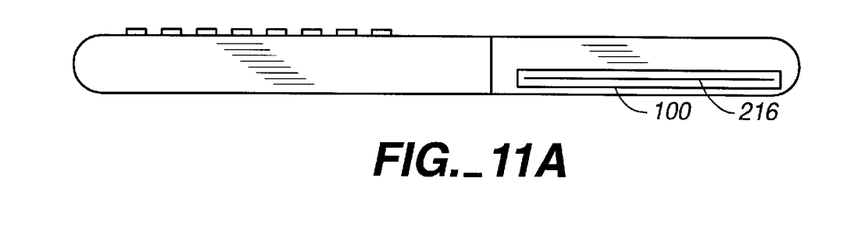
FIG. 11a is a front plan view of the digital personal organizer taken along the line 11a—11a in FIG. 11.

FIGS. 11 and 11a depict the document scanner 100 adapted for processing documents that are smaller than 8-½ inches wide. More specifically, FIGS. 11 and 11a show the document scanner 100 integrated into a digital personal organizer 262 to scan an approximately 2¼×3½ inch business card 264. The width of the scan is reduced for the document scanner 100 included in the personal organizer 262, and the medium transport consisting of the rolls and motor 202 and the electrostatic clamps 206 may be omitted. Otherwise the operation of the document scanner 100 is identical to that described above in connection with FIGS. 2–5. The business card 264 may be inserted slowly, manually if so desired, as indicated by an arrow 256. A roller 258, that contacts the business card 264 and is connected to a very small optical encoder, not separately illustrated in any of the FIGS. (or any inexpensive small angular encoder), encodes in simple fashion how far the card has traveled through the document scanner 100. With such manual feeding, the business card 264 is scanned repetitively at each successive position of the encoder to obtain sufficient information to reconstitute the image. only medium scanning resolution, e.g. 200 pixels per inch, is required for the document scanner 100 included in the personal organizer 262.

Figure 12:
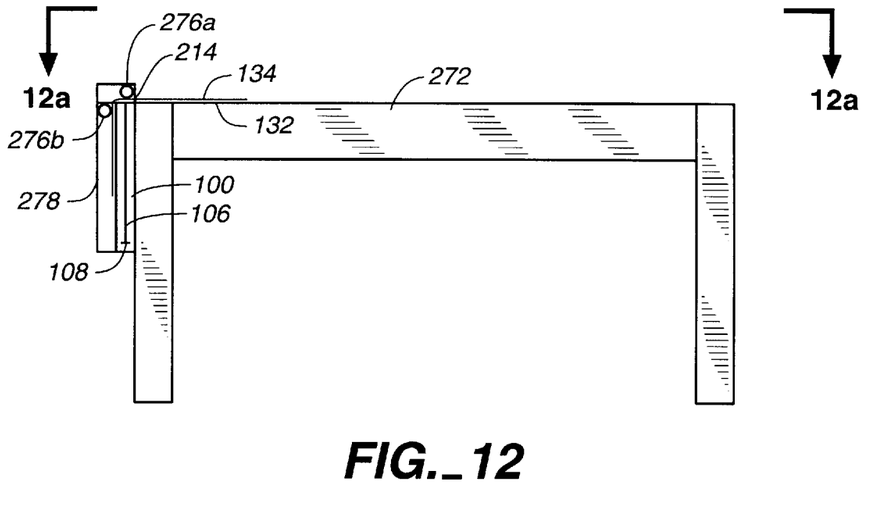
FIG. 12 is a front elevational view of a desk to the side of which is secured a document scanner in accordance with the present invention.
Figure 12A:
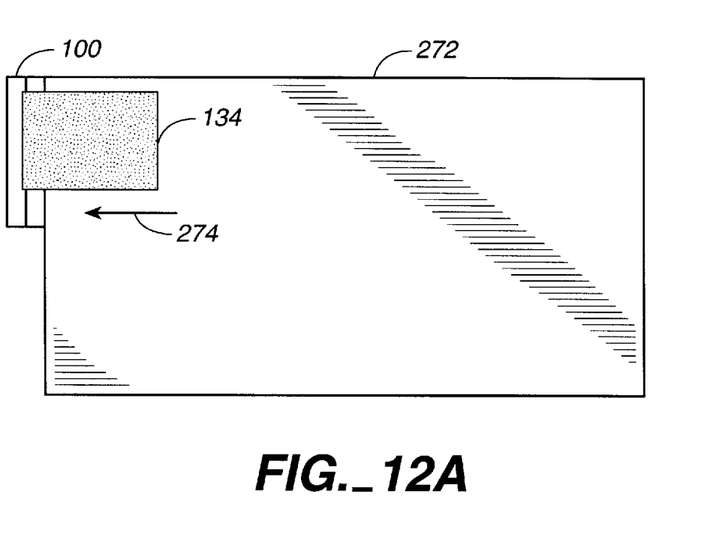
FIG. 12a is a plan view of the desk taken along the line 12a—12a in FIG. 12.

The document scanner 100 may, of course, also be used freestanding. FIGS. 12 and 12a illustrate such a configuration. In particular, FIGS. 12 and 12a illustrate the document scanner 100 hanging along one side of a desk 272 to minimi2e the footprint of the document scanner 100 on the desk 272. In such a configuration of the document scanner 100, the document 134 enters the input slit 214 at a 900 angle to the planar, fan-shaped region bounded by the dashed lines 124a and 124b. In this way the document scanner 100 accepts the document 134 directly from the top surface of the desk 272 with the printed surface 132 facing the desk 272. In the document scanner 100 depicted in FIGS. 12 and 12a, the turning mirror 122 is omitted and the beam of light 106 impinges on the surface 132 directly from the torsional scanner 108. After being scanned by the beam of light 106, the document 134 is turned through an angle of 90° by rollers 276a and 276b to fall into a pouch 278 disposed adjacent to the document scanner 100. The document scanner 100 depicted in FIGS. 12 and 12a uses either of the configurations for the optical detector 142 described in greater detail above with regard to FIGS. 2–5.

Although the present invention has been described in terms of the presently preferred embodiment, it is to be understood that such disclosure is purely illustrative and is not to be interpreted as limiting. While the preceding description of the document scanner 100 focuses on use of the medium scanner consisting of the light source 104, the torsional scanner 108, the aspheric lens 116, the turning mirror 122 and the detector 142 in the context of scanning the document 134, it is readily apparent to those skilled in the art that this medium scanner may also be used for scanning an intensity modulated beam of light 106 across either a photosensitive or a photo-conductive surface 132 for forming a latent image therein. Consequently, without departing from the spirit and scope of the invention, various alterations, modifications, and/or alternative applications of the invention will, no doubt, be suggested to those skilled in the art after having read the preceding disclosure. Accordingly, it is intended that the as encompassing all alterations, modifications, or alternative applications as fall within the true spirit and scope of the invention.

What is claimed is:

1. A compact medium scanner for scanning a surface of a medium, the medium scanner comprising:

a medium transport mechanism for advancing the surface of the medium along a medium transport path through a scanning station located within the medium scanner;

a light source for producing a beam of light;

a micromachined torsional scanner having a reciprocating mirror plate upon which the beam of light impinges, reciprocation of the mirror plate of said micromachined torsional scanner during a time interval of a single reciprocation deflecting the beam of light over a generally fan-shaped region having a substantially fixed optical path, the mirror plate being supported within said micromachined torsional scanner by a pair of coaxially aligned torsion bars disposed on opposite sides of the mirror plate, the torsion bars and the mirror plate being one piece;

mirror-plate drive means for rotating the mirror plate about the torsion bars from a rest position; and scanner optics for directing and focusing the beam of light onto the surface of the medium then present in the scanning station to thereby scan across the surface of the medium with the beam of light.

2. The compact medium scanner of claim 1 wherein said light source includes an intensity modulator, and wherein the surface of the medium is photo-sensitive.

3. The compact medium scanner of claim 1 wherein said light source includes an intensity modulator, and wherein the surface of the medium is photo-conductive.

4. The compact medium scanner of claim 1 wherein at least one of the torsion bars includes a torsional sensor that produces an electrical signal which indicates angular rotation of the mirror plate about the torsion bars from the rest position.

5. The compact medium scanner of claim 4 wherein reciprocation of the mirror plate of said micromachined torsional scanner is sinusoidal.

6. The compact medium scanner of claim 5 wherein the electrical signal from the torsional sensor is fed back to the mirror-plate drive means to establish the sinusoidal reciprocation of the mirror plate at a frequency equal to a principal torsional vibration mode of the mirror plate.

7. The compact medium scanner of claim 4 wherein reciprocation of the mirror plate of said micromachined torsional scanner is non-sinusoidal.

8. The compact medium scanner of claim 7 wherein the non-sinusoidal reciprocation of the mirror plate of said micromachined torsional scanner is saw-toothed.

9. The compact medium scanner of claim 7 wherein the electrical signal from the torsional sensor is fed back to the mirror-plate drive means to control the non-sinusoidal reciprocation of the mirror plate.

10. The compact medium scanner of claim 1 wherein said medium transport mechanism advances the medium in synchronism with reciprocation of the mirror plate.

11. The compact medium scanner of claim 1 wherein the medium is a document the surface of which scatters the beam of light impinging thereon, the medium scanner further comprising:

a light detector for receiving at least some of the beam of light scattered from the medium, and for producing an electrical signal responsive thereto.

12. The compact medium scanner of claim 11 wherein the electrical signal produced by said light detector is pixel data.

13. The compact medium scanner of claim 11 wherein said light detector is a linear array of photo-detectors.

14. The compact medium scanner of claim 1 wherein the fan-shaped region is substantially planar, and wherein said scanner optics includes a turning mirror upon which the planar fan-shaped region impinges for deflecting the beam of light before the beam of light impinges upon the surface of the medium.

15. The compact medium scanner of claim 14 wherein the medium transport path is substantially linear, and the planar fan-shaped region before impinging on the turning mirror is oriented substantially parallel to the medium transport path.

16. The compact medium scanner of claim 15 wherein the medium scanner is adapted for scanning letter size documents, the medium scanner further comprising a laptop personal computer ("PC") disposed over the medium scanner, and the medium scanner fitting within a footprint of said laptop PC.

17. The compact medium scanner of claim 15 wherein the medium scanner is adapted for scanning letter size documents, the medium scanner further comprising a keyboard which encloses the medium scanner.

18. The compact medium scanner of claim 15 wherein the medium scanner is adapted for scanning letter size documents, the medium scanner further comprising a desktop PC which encloses the medium scanner.

19. The compact medium scanner of claim 15 wherein the medium scanner is adapted for scanning letter size documents, the medium scanner further comprising a tower PC which encloses the medium scanner.

20. The compact medium scanner of claim 15 wherein the medium scanner is adapted for scanning business cards, the medium scanner further comprising a personal organizer which encloses the medium scanner.

21. The compact medium scanner of claim 1 wherein the medium transport path is substantially linear.

22. The compact medium scanner of claim 1 wherein the medium scanner includes a pair of sensors for producing electrical signals which respectively indicate beginning and ending a scan across the medium with the beam of light.

* * * * *